United States Patent [19]

Lehmann et al.

[11] Patent Number: 5,667,534
[45] Date of Patent: Sep. 16, 1997

[54] DYE MIXTURES COMPRISING 1:2 CHROMIUM COMPLEX DYES, AND 1:2 CHROMIUM COMPLEX DYES

[75] Inventors: Urs Lehmann, Basel; Marcel Frick, Reinach, both of Switzerland

[73] Assignee: Ciba-Geigy Corporation, Tarrytown, N.Y.

[21] Appl. No.: 580,005

[22] Filed: Dec. 20, 1995

[30] Foreign Application Priority Data

Dec. 21, 1994 [CH] Switzerland ............... 3853/94

[51] Int. Cl.$^6$ ............... D06P 3/06; C09B 45/00
[52] U.S. Cl. ............... 8/641; 8/643; 8/917; 8/924; 8/685
[58] Field of Search ............... 8/635–643, 918–925, 8/685

[56] References Cited

U.S. PATENT DOCUMENTS

| | | | |
|---|---|---|---|
| 3,491,125 | 1/1970 | Schwander et al. | 260/372 |
| 3,756,771 | 9/1973 | Beffa | 8/26 |
| 4,314,937 | 2/1982 | Beffa | 260/145 A |
| 4,553,976 | 11/1985 | Raisin et al. | 8/639 |
| 4,874,848 | 10/1989 | Back et al. | 534/684 |
| 4,944,768 | 7/1990 | Balliello et al. | 8/524 |

FOREIGN PATENT DOCUMENTS

| | | |
|---|---|---|
| 0625550 | 11/1994 | European Pat. Off. . |
| 1232916 | 10/1960 | France . |
| 1370438 | 10/1963 | France . |
| 716753 | 10/1954 | United Kingdom . |
| 719274 | 12/1954 | United Kingdom . |
| 745641 | 2/1956 | United Kingdom . |
| 851861 | 10/1960 | United Kingdom . |
| 903590 | 8/1962 | United Kingdom . |
| 945806 | 1/1964 | United Kingdom . |
| 2009214 | 6/1979 | United Kingdom . |

Primary Examiner—Margaret Einsmann
Attorney, Agent, or Firm—Kevin T. Mansfield

[57] ABSTRACT

Dye mixtures which comprise at least one 1:2 chromium complex dye of the formula (1)

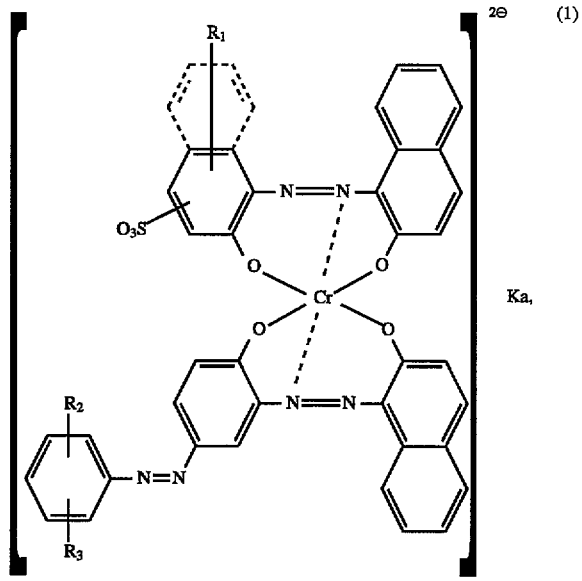

together with at least one 1:2 chromium or 1:2 cobalt complex dye of two identical or two different azo compounds from the group consisting of compounds of the formulae (2), (3) and (4) or together with at least one 1:2 cobalt complex dye of the formazan compound of the formula (5) or together with at least one anthraquinone dye of the formula (6). The dyes of formulae (1) are defined herein.

9 Claims, No Drawings

DYE MIXTURES COMPRISING 1:2 CHROMIUM COMPLEX DYES, AND 1:2 CHROMIUM COMPLEX DYES

The present invention relates to novel dye mixtures comprising 1:2 chromium complex dyes and to novel 1:2 chromium complex dyes, processes for their preparation and their use for dyeing or printing fibre materials or leather.

The invention relates to dye mixtures which comprise at least one 1:2 chromium complex dye of the formula (1)

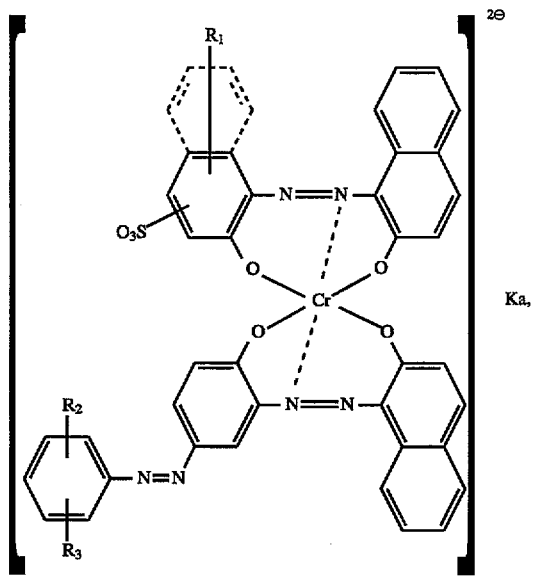

in which $R_1$ is hydrogen or nitro,

Ka is a cation and $R_2$ and $R_3$ independently of one another are hydrogen, $C_1$–$C_4$alkyl, $C_1$–$C_4$alkoxy, $C_2$–$C_4$hydroxyalkoxy, sulfo, carboxyl or a radical of the formula —$SO_2N(R_4)$ $R_5$ or —$CON(R_4)R_5$, in which $R_4$ and $R_5$ independently of one another are hydrogen or substituted or unsubstituted $C_1$–$C_4$alkyl or phenyl, together with at least one 1:2 chromium or 1:2 cobalt complex dye of two identical or two different azo compounds from the group consisting of compounds of the formulae (2), (3) and (4)

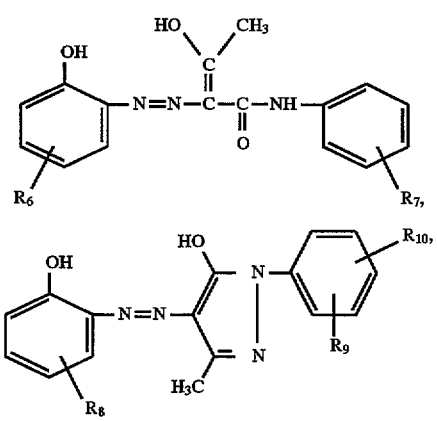

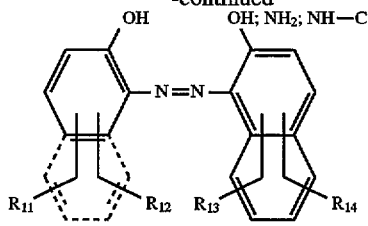

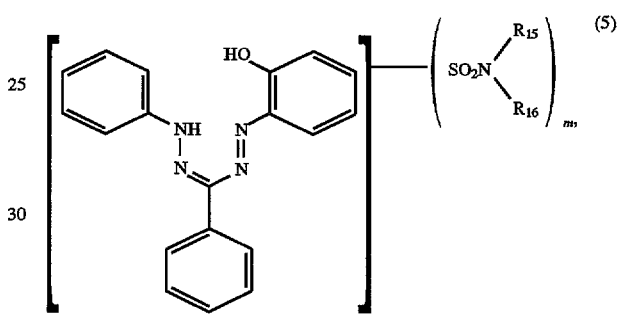

in which $R_6$, $R_7$, $R_8$, $R_9$, $R_{10}$, $R_{11}$, $R_{12}$, $R_{13}$ and $R_{14}$ independently of one another are hydrogen, $C_1$–$C_4$alkyl, $C_1$–$C_4$alkoxy, $C_2$–$C_4$alkanoylamino, halogen, sulfo, hydroxyl, nitro or sulfamoyl, or N—$C_1$–$C_4$alkylsulfamoyl which is unsubstituted or further substituted in the alkyl part by hydroxyl or $C_1$–$C_4$alkoxy, or together with at least one 1:2 cobalt complex dye of the formazan compound of the formula (5)

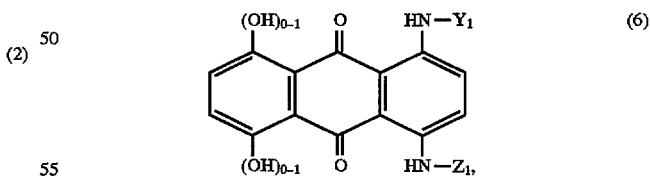

in which $R_{15}$ and $R_{16}$ independently of one another are hydrogen or $C_1$–$C_4$alkyl which is unsubstituted or substituted by hydroxyl or $C_1$–$C_4$alkoxy, m is the number 1, 2 or 3 and the phenyl radicals of the compound of the formula (5) contain no further substituents or are further substituted by $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl or nitro, or together with at least one anthraquinone dye of the formula (6)

$$\text{(6)}$$

[structure of anthraquinone (6) with $(OH)_{0-1}$, $HN-Y_1$, $(OH)_{0-1}$, $HN-Z_1$]

in which $Y_1$ is $C_1$–$C_4$alkyl; phenyl which is unsubstituted or substituted by $C_1$–$C_4$alkyl, $C_1$–$C_4$alkoxy, halogen or sulfo; phenyl-$C_1$–$C_8$alkyl, in which the phenyl radical contains no further substituents or is substituted by $C_1$–$C_4$alkyl, $C_1$–$C_4$alkoxy, halogen, sulfo, benzoylaminomethyl, chloroacetylaminomethyl or acryloylaminomethyl; cyclohexyl which is unsubstituted or substituted by $C_1$–$C_4$alkyl or sulfobenzyl; or 1,2,3,4-tetrahydronaphthyl which is substituted by sulfo, and $Z_1$ is defined as above for $Y_1$, or is a radical of the formula

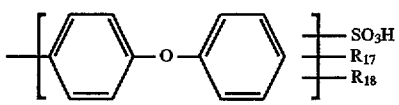

in which $R_{17}$ is hydrogen, $C_1$–$C_4$alkyl, $C_1$–$C_4$alkoxy or halogen and $R_{18}$ is chloroacetylaminomethyl or acryloylaminomethyl.

$C_1$–$C_4$Alkyl $R_2$, $R_3$, $R_4$ and $R_5$ are, independently of one another, methyl, ethyl, propyl, isopropyl, butyl, isobutyl, sec-butyl or tert-butyl, in particular methyl. $C_1$–$C_4$Alkyl radicals $R_4$ and $R_5$ can furthermore be substituted, for example by hydroxyl or $C_1$–$C_4$alkoxy.

$C_1$–$C_4$Alkoxy $R_2$ and $R_3$ are, independently of one another, methoxy, ethoxy, propoxy, isopropoxy, butoxy, sec-butoxy, isobutoxy or tert-butoxy, in particular methoxy or ethoxy, preferably methoxy.

$C_2$–$C_4$Hydroxyalkoxy $R_2$ and $R_3$ is, for example, the β-hydroxyethoxy radical.

Phenyl radicals $R_4$ and $R_5$ can be unsubstituted or substituted. Examples of such substituents are $C_1$–$C_4$alkyl, $C_1$–$C_4$alkoxy, $C_2$–$C_4$alkanoylamino, halogen, sulfo, hydroxyl, carboxyl, nitro, in particular $C_1$–$C_4$alkyl, $C_1$–$C_4$alkoxy, $C_2$–$C_4$alkanoylamino or halogen.

$R_1$ is preferably hydrogen.

$R_4$ and $R_5$ are preferably hydrogen or $C_1$–$C_4$alkyl, in particular hydrogen.

$R_2$ and $R_3$ are preferably independently of one another hydrogen, $C_1$–$C_4$alkyl, $C_1$–$C_4$alkoxy or sulfo. Preferably, $R_2$ is hydrogen, $C_1$–$C_4$ alkyl or $C_1$–$C_4$alkoxy and $R_3$ is $C_1$–$C_4$alkoxy or sulfo. Particularly preferably, $R_2$ is hydrogen and $R_3$ is $C_1$–$C_4$alkoxy.

In an interesting embodiment, $R_2$ is hydrogen or $C_1$–$C_4$alkyl, in particular hydrogen or methyl.

In another interesting embodiment, $R_3$ is carboxyl, carbamoyl or $C_2$–$C_4$hydroxyalkoxy, in particular carbamoyl or $C_2$–$C_4$hydroxyalkoxy, and preferably $C_2$–$C_4$hydroxyalkoxy. The β-hydroxyethoxy radical is of particular interest here as a $C_2$–$C_4$hydroxyalkoxy radical $R_3$.

The radical $R_3$ is preferably bonded in the 4-position relative to the azo bridge.

1:2 chromium complex dyes of the formula (1) which are of particular interest are those of the formula

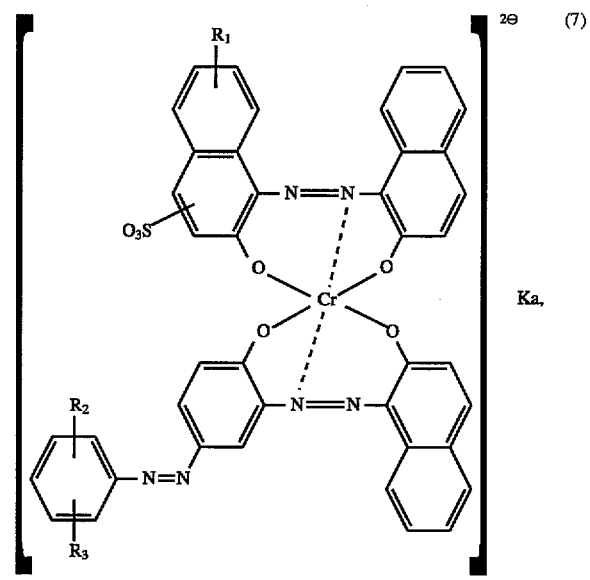

in which $R_1$, $R_2$, $R_3$ and Ka are as defined and preferred above.

Preferred 1:2 chromium complex dyes of the formula (1), in particular those of the formula (7), are those in which $R_2$ is hydrogen, $C_1$–$C_4$alkyl or $C_1$–$C_4$alkoxy, $R_3$ is carboxyl, sulfamoyl, carbamoyl or $C_2$–$C_4$hydroxyalkoxy and $R_1$ is as defined and preferred above.

In particular, $R_2$ is hydrogen or $C_1$–$C_4$alkyl and $R_3$ is $C_2$–$C_4$hydroxyalkoxy. Hydrogen is of particular interest for $R_1$.

Especially preferred 1:2 chromium complex dyes of the formula (1), in particular those of the formula (7), are those in which $R_2$ is hydrogen, $C_1$–$C_4$alkyl or $C_1$–$C_4$alkoxy, $R_3$ is a $C_1$–$C_4$alkoxy radical bonded in the 3- or 4-position and $R_1$ is as defined and preferred above.

In particular, $R_2$ is hydrogen. Hydrogen is of particular interest for $R_1$. The radical $R_3$ is preferably bonded in the 4-position relative to the azo bridge.

Particularly important 1:2 chromium complex dyes are those of the formula

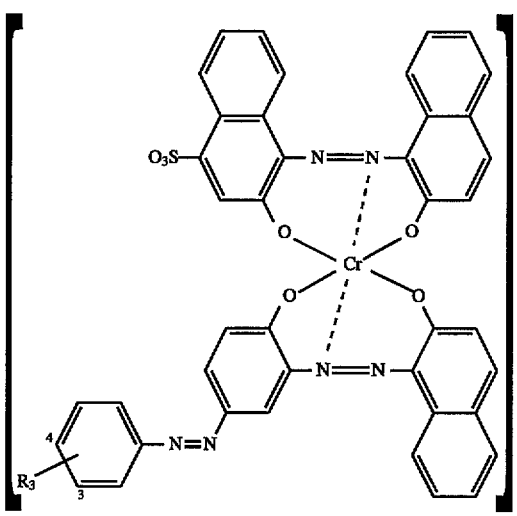

in which

R₃ is a $C_1$–$C_4$alkoxy radical bonded in the designated 3- or 4-position and

Ka is a cation.

The radical $R_3$ is, in particular, methoxy or ethoxy, preferably methoxy. Preferably, the radical $R_3$ is bonded in the designated 4-position.

Cations Ka are, for example, alkali metal, alkaline earth metal, ammonium, alkanolammonium or alkylammonium cations. Ka is in general to be understood as meaning counter-ions to the negatively charged 1:2 chromium complex dyes, and Ka can also be more than one cation, for example as in the case of monovalent cations. Preferred alkanolammonium or alkylammonium salts are those which contain 1 to 4 alkyl or alkanoyl radicals each having 1 to 4 carbon atoms. Examples of corresponding cations are the sodium, lithium or ammonium cations or mono-, di- or triethanolammonium cations. Sodium, lithium or ammonium cations are of particular interest.

$C_1$–$C_4$Alkyl $R_6$ to $R_{17}$, $Y_1$ and $Z_1$ and the corresponding substituents of the formazan compound of the formula (5) are, independently of one another, methyl, ethyl, propyl, isopropyl, butyl, isobutyl, sec-butyl or tert-butyl, in particular methyl. $C_1$–$C_4$Alkyl radicals $R_{15}$ and $R_{16}$ can be further substituted by hydroxyl or $C_1$–$C_4$alkoxy, for example methoxy or ethoxy.

$C_1$–$C_4$Alkoxy $R_6$ to $R_4$, $R_{17}$ and $R_{18}$ and the corresponding substituents of the formazan compound of the formula (5) are, independently of one another, methoxy, ethoxy, propoxy, isopropoxy, butoxy, sec-butoxy, isobutoxy or tert-butoxy, in particular methoxy.

$C_2$–$C_4$Alkanoylamino $R_6$ to $R_{14}$ and the corresponding substituents of the formazan compound of the formula (5) are, independently of one another, for example, acetylamino or propionylamino, in particular acetylamino.

Halogen $R_6$ to $R_4$, $R_{17}$ and $R_{18}$ and the corresponding substituents of the formazan compound of the formula (5) are, independently of one another, for example, fluorine, chlorine or bromine, in particular chlorine.

1:2 chromium or 1:2 cobalt complex dyes of two identical or two different azo compounds from the group consisting of compounds of the formulae (2), (3) and (4) are, in particular, the following:

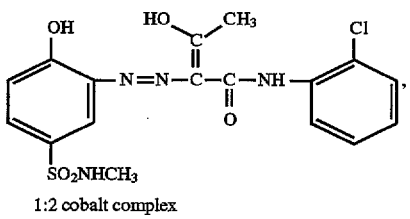

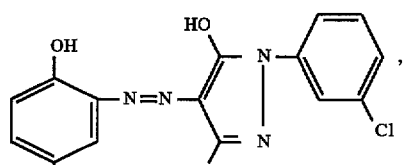

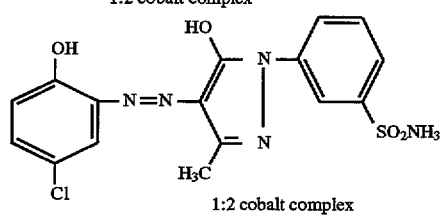

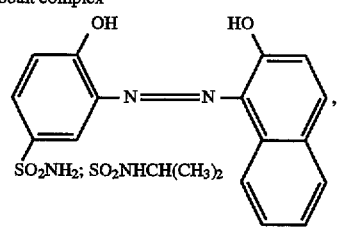

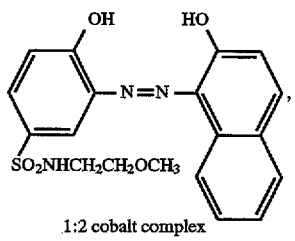

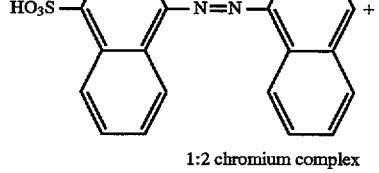

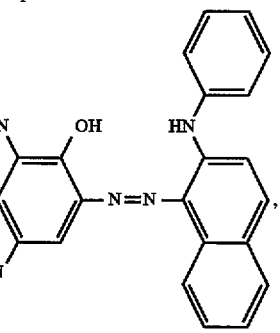

-continued

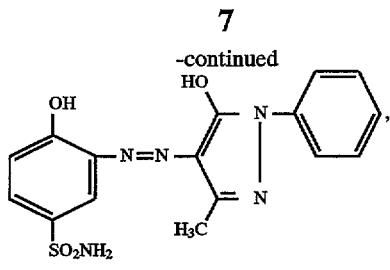
1:2 cobalt complex (14)

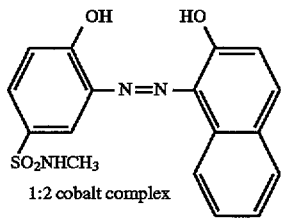
1:2 cobalt complex (15)

and

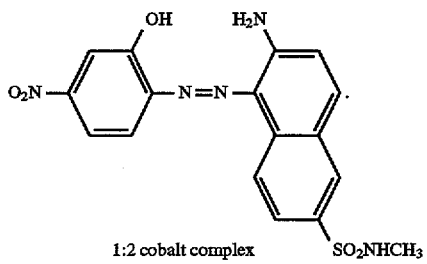
1:2 cobalt complex (16)

The 1:2 cobalt complex dyes of the formulae (9), (10), (11), (12) and (16) and the 1:2 chromium complex dye of the formula (13) are of particular interest.

$R_{15}$ and $R_{16}$ are particularly preferably hydrogen or $C_1$–$C_4$ which is unsubstituted or substituted by hydroxyl. In particular, one of the radicals $R_{15}$ and $R_{16}$ is hydrogen. $R_{15}$ and $R_{16}$ are especially preferably independently of one another hydrogen or $C_1$–$C_4$alkyl, in particular hydrogen or methyl.

The number 1 or 2, in particular the number 2, is preferred for m.

Particularly preferred formazan compounds of the formula (5) are those of the formula

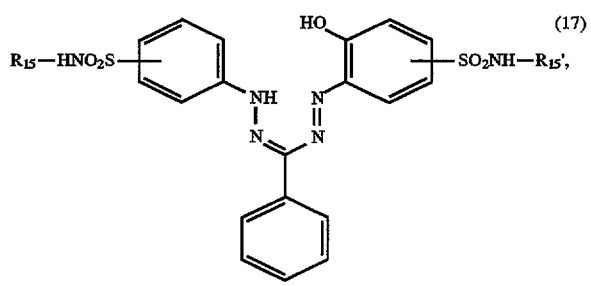
(17)

in which $R_{15}$ and $R_{15}'$ independently of one another are hydrogen or $C_1$–$C_4$alkyl and the phenyl radicals contain no further substituents or can be further substituted as defined above under formula (5).

Preferably, the phenyl radicals of the compound of the formula (17) contain no further substituents.

The formazan compounds of the formula (5) are especially preferably compounds of the formula

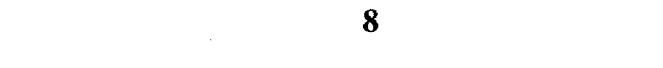
(18)

in which the phenyl radicals contain no further substituents or can be further substituted as defined above for the compound of the formula (5).

Preferably, the phenyl radicals of the compound of the formula (18) contain no further substituents.

Particularly preferred anthraquinone dyes of the formula (6) are anthraquinone dyes of the formula

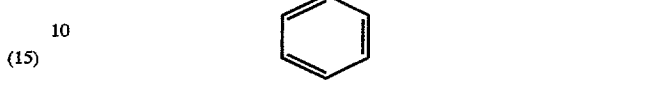
(19)

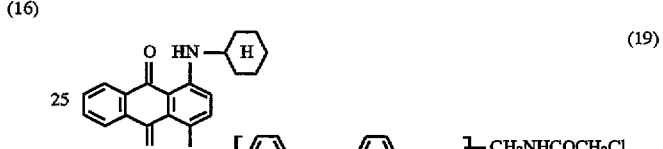
(20)

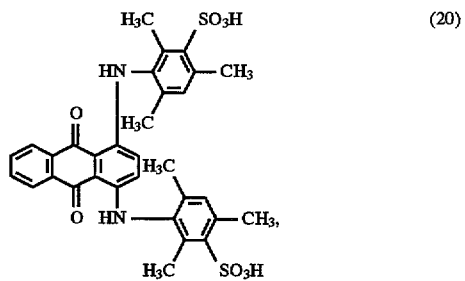
(21)

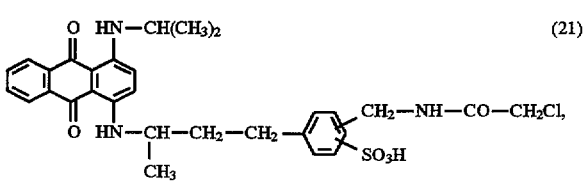
(22)

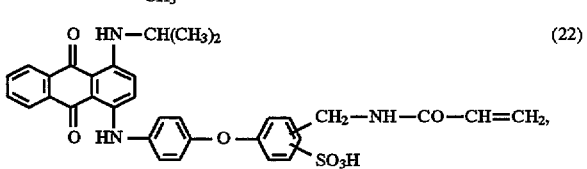
(23)

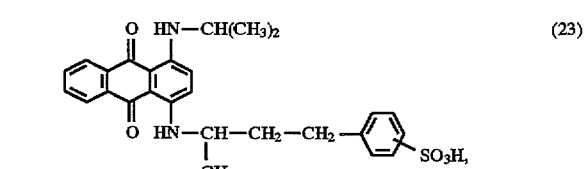
(24)

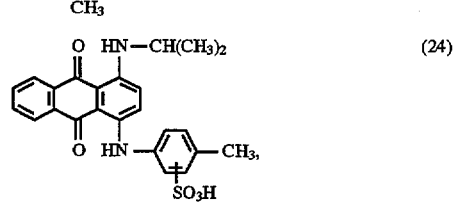

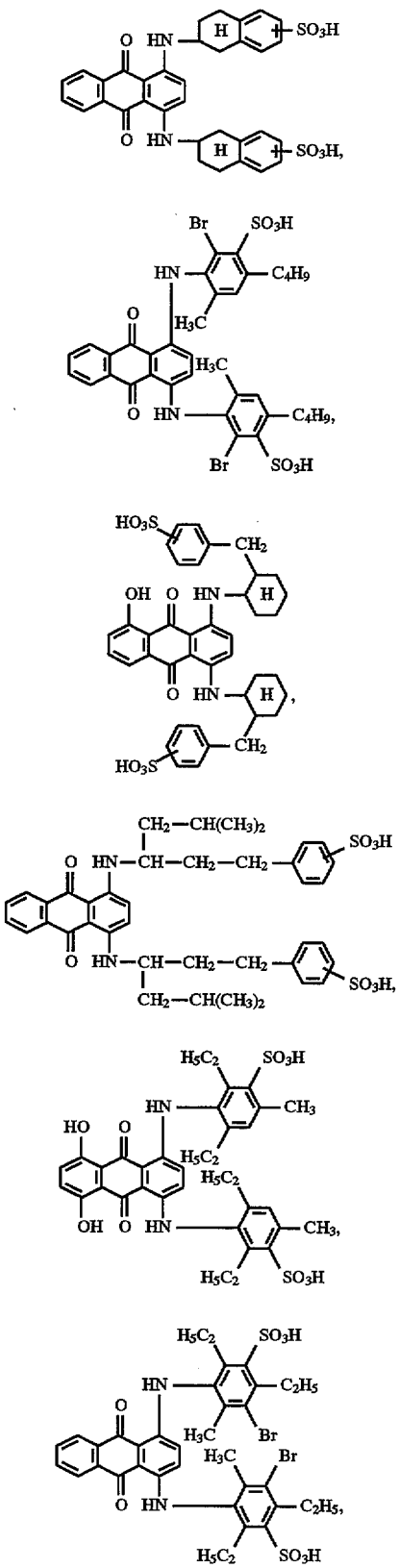
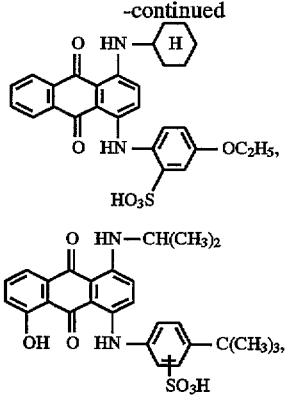

The anthraquinone dye of formula (31) is of particular interest.

The 1:2 chromium complex dye of the formula (1) contained in the dye mixtures according to the invention is subject to the definitions and preferences given above.

Dye mixtures which, in addition to the 1:2 chromium complex dye of the formula (1), comprise at least one dye of the formulae 9 to 16 and 18 to 33 are particularly preferred. Dye mixtures which, in addition to the 1:2 chromium complex dye of the formula (1), comprise at least one dye of the formulae (9), (10), (11), (12), (13) and (16) are especially preferred. Dye mixtures which, in addition to the 1:2 chromium complex dye of the formula (1), comprise a dye of the formula (31) are furthermore particularly preferred.

The dye mixtures according to the invention preferably comprise at least one 1:2 chromium complex dye of the formula (1) together with at least one 1:2 chromium or 1:2 cobalt complex dye of two identical or two different azo compounds from the group consisting of compounds of the formulae (2), (3) and (4), in particular together with at least one dye of the formulae (9), (10), (11), (12), (13) and (16). These dye mixtures can additionally comprise, as further component, a formazan dye of the formula (5) and/or an anthraquinone dye of the formula (6). The components mentioned are as defined and preferred above.

The 1:2 chromium complex dyes of the formula (1) furthermore are suitable for a process for trichromatic dyeing or printing of naturally occurring or synthetic polyamide fibre material. In addition to the 1:2 chromium complex dye of the formula (1), a 1:2 cobalt complex dye of the formazan compound of the formula (5) can be used in this process. Yellow- or orange-dyeing components which are preferably used are dyes of the formula (9) or (10), and a dye of the formula (11) or (12) is preferably used as a red-dyeing component. The 1:2 chromium complex dyes of the formula (1) and the formazan compounds of the formula (5) here are as defined and preferred above.

The dye mixtures according to the invention can be prepared, for example, by mixing the individual dyes. This mixing process is carried out, for example, in suitable mills, for example bead and pinned disc mills, and in kneaders or mixers.

The dye mixtures can furthermore be prepared, for example, by spray-drying the aqueous dye mixtures.

The dye mixtures preferably comprise 5 to 95% by weight, in particular 10 to 90% by weight, and preferably 20 to 80% by weight, of the 1:2 chromium complex dye, based on the total mount of the dyes of the mixtures.

If they contain sulfo groups, the individual dyes are present in the dye mixtures according to the invention either in the form of their free sulfonic acid or, preferably, as salts thereof, for example the alkali metal, alkaline earth metal or ammonium salts, or as salts of an organic amine. Examples are the sodium, lithium or ammonium salts or the salt of triethanolamine. Counter-ions of metal complex dyes with a negative charge are, for example, the cations of the above salts.

The dye mixtures as a rule comprise further additives, for example sodium chloride or dextrin.

The present invention furthermore relates to novel 1:2 chromium complex dyes of the formula

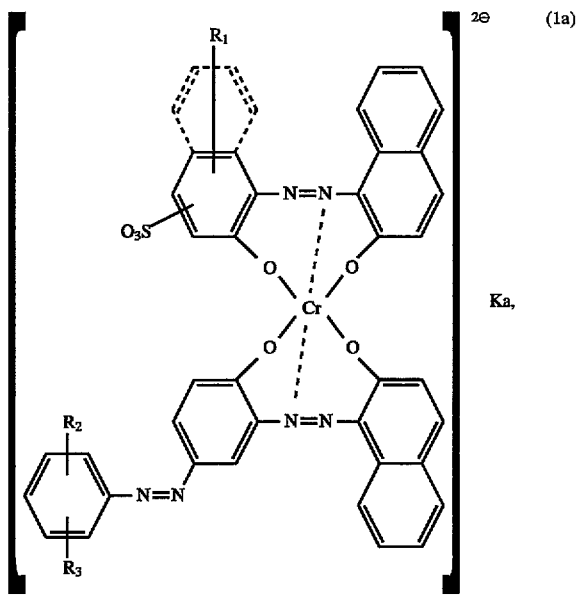

(1a)

in which $R_1$ is hydrogen or nitro,

Ka is a cation, $R_2$ is hydrogen, $C_1$–$C_4$alkyl or $C_1$–$C_4$alkoxy and $R_3$ is $C_1$–$C_4$alkoxy, $C_2$–$C_4$hydroxyalkoxy, sulfo, carboxyl, sulfamoyl or carbamoyl, with the proviso that if $R_2$ is hydrogen, $R_3$ is not sulfo or a $C_1$–$C_4$alkoxy radical bonded in the 2-position or a methoxy radical bonded in the 4-position.

$R_1$ is preferably hydrogen.

Preferred 1:2 chromium complex dyes of the formula (1a) are those in which $R_2$ is hydrogen, $C_1$–$C_4$alkyl or $C_1$–$C_4$alkoxy and $R_3$ is carboxyl, sulfamoyl, carbamoyl or $C_2$–$C_4$— hydroxyalkoxy.

$R_2$ here is preferably hydrogen or $C_2$–$C_4$alkyl, in particular hydrogen or methyl. $R_3$ here is preferably carboxyl, carbamoyl or $C_2$–$C_4$hydroxyalkoxy, in particular carbamoyl or $C_2$–$C_4$hydroxyalkoxy, and preferably $C_2$–$C_4$hydroxyalkoxy.

$R_3$ here is particularly preferably the β-hydroxyethoxy radical.

1:2 chromium complex dyes of the formula (1a) which are furthermore preferred are those in which $R_3$ is a $C_1$–$C_4$alkoxy radical bonded in the 3-position and $R_2$ is hydrogen, $C_1$–$C_4$alkyl or $C_1$–$C_4$alkoxy.

The radical $R_3$ here is preferably methoxy or ethoxy, in particular methoxy. The radical $R_2$ here is preferably hydrogen or $C_1$–$C_4$alkoxy, in particular hydrogen or methoxy, and preferably hydrogen.

1:2 Chromium complex dyes of the formula (1a) which are furthermore of interest are those in which $R_3$ is a $C_2$–$C_4$alkoxy radical, in particular an ethoxy radical, bonded in the 4-position and $R_2$ is hydrogen.

Particularly preferred 1:2 chromium complex dyes of the formula (1a) are those in which $R_2$ is $C_1$–$C_4$alkyl or, in particular, $C_1$–$C_4$alkoxy and $R_3$ is sulfo.

1:2 chromium complex dyes which are of particular interest are those of the formula

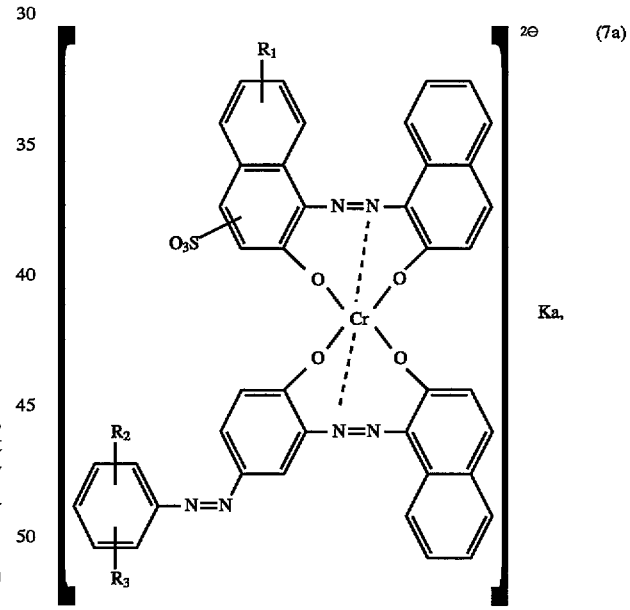

(7a)

in which $R_1$, $R_2$, $R_3$ and Ka are as defined and preferred above.

Particularly important 1:2 chromium complex dyes are those of the formula

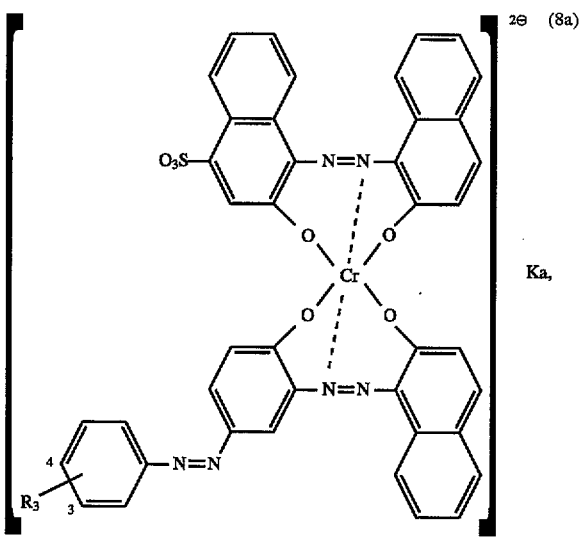

in which

R$_3$ is a C$_1$–C$_4$alkoxy radical bonded in the designated 3-position or a C$_2$–C$_4$alkoxy radical, in particular ethoxy radical, bonded in the designated 4-position and Ka is a cation.

The radical R$_3$ bonded in the 3-position is, in particular, methoxy or ethoxy, preferably methoxy.

Cations Ka are, for example, those mentioned above.

The present invention furthermore relates to a process for the preparation of 1:2 chromium complex dyes of the formula (1a), which comprises reacting a 1:1 chromium complex compound of the formula

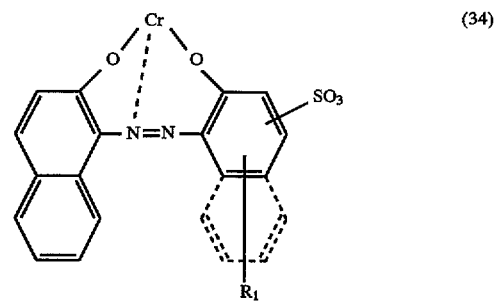

with an azo compound of the formula

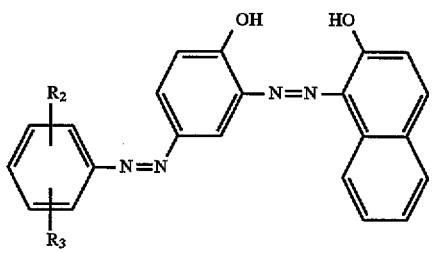

in which

R$_1$, R$_2$ and R$_3$ are as defined under formula (1a).

The reaction of the 1:1 chromium complex compound of the formula (34) with the azo compound of the formula (35) is carried out, for example, in an aqueous medium at a temperature of, for example, 40° to 130° C., in particular 70° to 100° C., at a pH of, for example, 8 to 14, in particular at a pH of 10 to 13. The reaction is advantageously carried out in the presence of an agent which neutralizes mineral acid or an alkaline agent, for example in the presence of an alkali metal carbonate, alkali metal acetate or alkali metal hydroxide, sodium being preferred as the alkali metal.

The compounds of the formulae (34) and (35) are known or can be obtained analogously to known processes.

1:1 chromium complex compounds of the formula (34) can thus be obtained in accordance with customary chroming processes, in which the reaction can be carried out with the chromium salt, for example in an aqueous medium, if appropriate under pressure, at a temperature of, for example, 90° to 130° C. Chromium salts are, for example, chromium(III) acetate, chromium(III) nitrate, chromium(III) chloride, chromium(III) salicylate or, in particular, chromium(III) sulfate.

Compounds of the formula (35) can be obtained by customary diazotization and coupling reactions. The diazotization is as a rule carried out by the action of nitrous acid in aqueous-mineral acid solution at a low temperature, for example 0° to 20° C., and the coupling is advantageously carried out at an alkaline pH, for example at a pH of 8 to 12.

1:2 chromium complex dyes of the formula (1) can be obtained analogously to the process described for preparation of the 1:2 chromium complex dyes of the formula (1a).

The 1:2 chromium or 1:2 cobalt complex dyes of two identical or two different azo compounds from the group consisting of compounds of the formulae (2), (3) and (4), the formazan compounds of the formula (5) and the anthraquinone dyes of the formula (6) are known or can be obtained analogously to known compounds.

The 1:2 cobalt complex dyes of the formazan compounds of the formula (5) can be prepared in a manner known per se, for example by metallizing the metal-free compound of the formula (5) with a cobalt salt.

The metallization takes place, for example, in an aqueous medium which has an alkaline pH, for example a pH of 7.5 to 12, and preferably 8 to 12, at a temperature of 40° to 100° C., and in particular 40° to 60° C. Suitable cobalt salts are, for example, the acetate, nitrate, chloride or, in particular, the sulfate.

The 1:2 chromium or 1:2 cobalt complex dyes of two identical or two different azo compounds from the group consisting of compounds of the formulae (2), (3) and (4) can be obtained, for example, analogously to the processes described in GB-A-716,753, GB-A-719,274, GB-A-745,641 and GB-A-851,861.

Anthraquinone dyes of the formula (6) can be obtained, for example, analogously to the processes described in GB-A-903,590, GB-A-945,806, GB-A-2,009,214 and U.S. Pat. No. 3,491,125.

The invention furthermore relates to a process for dyeing or printing leather or fibre materials containing hydroxyl groups or containing nitrogen with the 1:2 chromium complex dyes of the formula (1) according to the invention and the dye mixtures according to the invention.

Fibre materials are preferably either naturally occuring polyamide fibre materials, for example silk or, in particular, wool, or synthetic polyamide fibre materials, for example polyamide 6 or polyamide 6,6, or wool- or polyamide-containing blend fabric. Synthetic polyamide fibre materials are of particular interest here.

The above fibre material can be in the most diverse processing forms, for example as fibre, yarn, woven fabric or knitted fabric, and in particular in the form of carpets.

The dyeing or printing can be carried out in customary dyeing or printing apparatuses. The dye liquors or printing pastes can comprise further additives, for example wetting agents, antifoams, levelling agents or agents which influence the properties of the textile material, for example softening agents, additives for providing a flame-resistant finish or soil-, water- and oil-repellent agents, as well as water-softening agents and naturally occurring or synthetic thickeners, for example alginates and cellulose ethers.

The 1:2 chromium complex dyes of the formula (1a) according to the invention and the dye mixtures according to the invention give level dyeings with good all-round properties, in particular good fastness to rubbing, wet processing, wet rubbing, light and hot light. The 1:2 chromium complex dyes of the formula (1a) according to the invention and the dye mixtures according to the invention furthermore are distinguished by advantageous properties in respect of toxicity and good affinity properties.

In the following examples, parts are by weight. The temperatures are degrees Celsius. Parts by weight bear the same relation to parts by volume as the gram to the cubic centimetre.

PREPARATION EXAMPLE 1 a) 12.32 parts of p-anisidine are stirred in a mixture of 200 parts of water and 30 parts of hydrochloric acid (32%) at a temperature of 40° to 50° C. The reaction mixture is then cooled to a temperature of 0° to 5° C. and diazotization is carried out in the course of about 30 minutes by addition of 25.9 parts of a 4-normal aqueous sodium nitrite solution.

To prepare a solution of the coupling component, 15.88 parts of 2-acetamidophenol are dissolved in a mixture of 100 parts of ice-water and 12 parts of an aqueous sodium hydroxide solution (30%). The solution is then cooled to a temperature of −5° to 0° C. After addition of 24 parts of sodium chloride, the solution, obtainable as described above, of the diazo component is allowed to run into the resulting solution of the coupling component at a temperature of 0° C. in the course of about 90 minutes, the pH being kept at a value of 10 by addition of an aqueous sodium hydroxide solution. The mixture is subsequently stirred overnight in an ice-bath and the product which has precipitated out is filtered off and washed with aqueous sodium chloride solution. A paste which comprises the compound of the formula

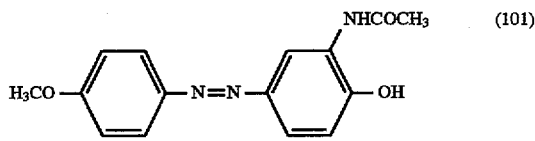

is obtained.

b) 84.6 parts of the paste which is obtainable as described above under a) and comprises the compound of the formula (101) are stirred in 250 parts of a 2-normal aqueous sodium hydroxide solution and hydrolysed under reflux in the course of 4 hours. The resulting solution is then cooled to a temperature of 15° to 20° C., brought to a pH of 7 with hydrochloric acid (16%) and left to stand overnight. The product which has precipitated out is filtered out and washed with aqueous sodium chloride solution. A paste which comprises the compound of the formula

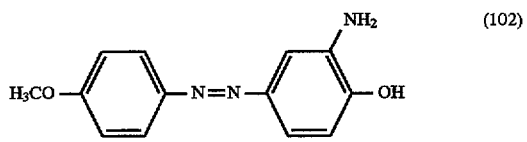

is obtained.

c) 102.3 parts of the paste which is obtainable as described above under b) and comprises the compound of the formula (102) are dissolved in a mixture of 150 parts of water and 18.3 parts of an aqueous sodium hydroxide solution (15%) at room temperature and a pH of about 12.25 parts of a 4-normal aqueous sodium nitrite solution are then added, while stirring. The solution thus obtained is added to a mixture of 50 parts of ice-water and 35 parts of hydrochloric acid (32%) in the course of 2 hours, the temperature being kept at 0° to 5° C. The mixture is subsequently stirred at this temperature for 1 hour and excess nitrite is then destroyed with sulfamic acid. The resulting product is then filtered off and washed with aqueous sodium chloride solution. The paste thus obtained is suspended in 200 parts of water.

To prepare a solution of the coupling component, 13.6 parts of β-naphthol are dissolved in a mixture of 250 parts of water, 14 parts of an aqueous sodium hydroxide solution (30%) and 10.28 parts of sodium carbonate at a temperature of 60° C. The mixture is then cooled to a temperature of 15° C. and the suspension, obtainable as described above, of the diazo component is allowed to run into the resulting solution of the coupling component at a temperature of 15° C. in the course of about 5 to 10 minutes. The mixture is subsequently stirred overnight at room temperature and a pH of 12 and, after heating to 85° C., the product which has precipitated out is filtered off, washed with aqueous sodium chloride solution and dried in vacuo at a temperature of 50° C. A compound which has the formula

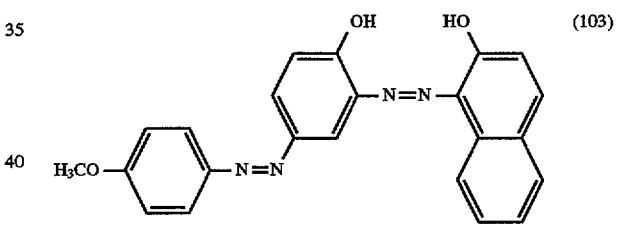

is obtained.

d) 39.4 parts of the compound of the formula

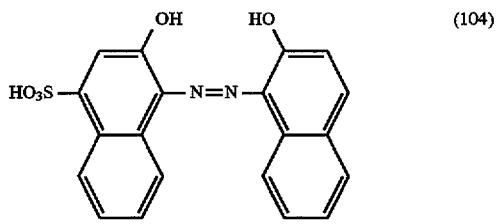

are suspended in 500 parts of water, 13.7 parts of formic acid and 6.24 parts of chromium(III) acetate and the mixture is heated at a temperature of 100° to 105° C. in an autoclave for 20 hours. After cooling to room temperature, the product which has precipitated out is filtered off, washed with water and dried in vacuo at a temperature of 50° C. A 1:1 chromium compound which has the formula

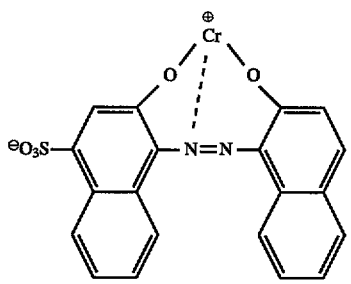

is obtained.

e) 4 parts of the compound of the formula (103) are stirred in a mixture of 100 parts of water and 0.5 part of an aqueous sodium hydroxide solution (15%) at a temperature of 85° C. and a pH of about 11. 4.43 parts of the 1:1 chromium complex compound of the formula (105) are then introduced into the resulting suspension in the course of 30 minutes, the pH being kept at a value of 11 by addition of an aqueous sodium hydroxide solution (30%). After addition of 0.4 parts of sodium carbonate and 450 parts of water, the temperature is increased to 95° C. and the reaction mixture is stirred for 1 hour. Sodium chloride is then added and the temperature is lowered to 90° C. After filtration, washing with aqueous sodium chloride solution and drying in vacuo at a temperature of 50° C., a dye which has the formula

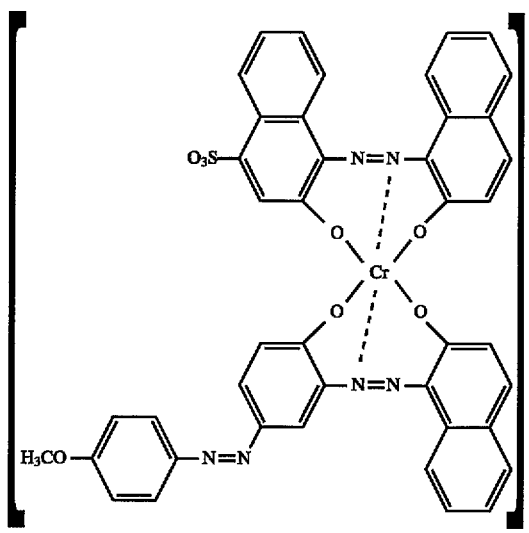

is obtained. The dye of the formula (106) dyes wool and synthetic polyamide fibre material in black colour shades.

EXAMPLES 1 to 16

1:2 chromium complex dyes of the formula

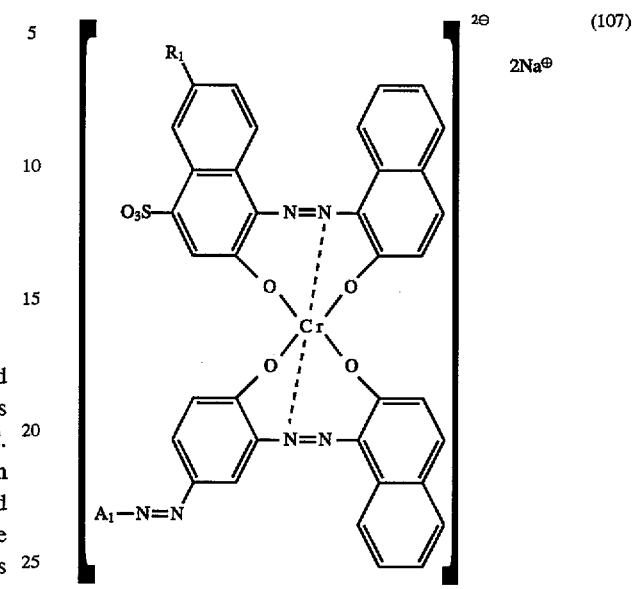

in which $A_1$ and $R_1$ are as defined in columns 2 and 3 in the following Table 1, which dye wool and synthetic polyamide fibre material in black colour shades can be obtained in a manner analogous to the instructions in Preparation Example 1.

TABLE 1

| Ex. | $A_1$ | $R_1$ |
|---|---|---|
| 1 | H₃CO—⌬—OCH₃ | —H |
| 2 | H₃C—⌬—OCH₂CH₂OH | —H |
| 3 | H₂NO₂S—⌬— | —H |
| 4 | HOOC—⌬— | —H |
| 5 | ⌬—COOH | —H |

TABLE 1-continued

| Ex. | A₁ | R₁ |
|---|---|---|
| 6 | 2,4-dimethoxyphenyl (H₃CO-, -OCH₃) | $-NO_2$ |
| 7 | 4-methyl-2-(2-hydroxyethoxy)phenyl (OCH₂CH₂OH, H₃C-) | $-NO_2$ |
| 8 | 4-sulfamoylphenyl (H₂NO₂S-) | $-NO_2$ |
| 9 | 4-carboxyphenyl (HOOC-) | $-NO_2$ |
| 10 | 2-carboxyphenyl (COOH) | $-NO_2$ |
| 11 | 4-methoxy-2-sulfophenyl (OCH₃, SO₃H) | $-NO_2$ |
| 12 | 4-methoxy-2-sulfophenyl (OCH₃, SO₃H) | $-H$ |
| 13 | 4-methoxy-2-sulfophenyl (H₃CO-, SO₃H) | $-NO_2$ |
| 14 | 4-methoxy-2-sulfophenyl (H₃CO-, SO₃H) | $-H$ |
| 15 | 4-ethoxyphenyl (H₅C₂O-) | $-H$ |
| 16 | 4-ethoxyphenyl (H₅C₂O-) | $-NO_2$ |

EXAMPLES 17 to 24

1:2 chromium complex dyes of the formula

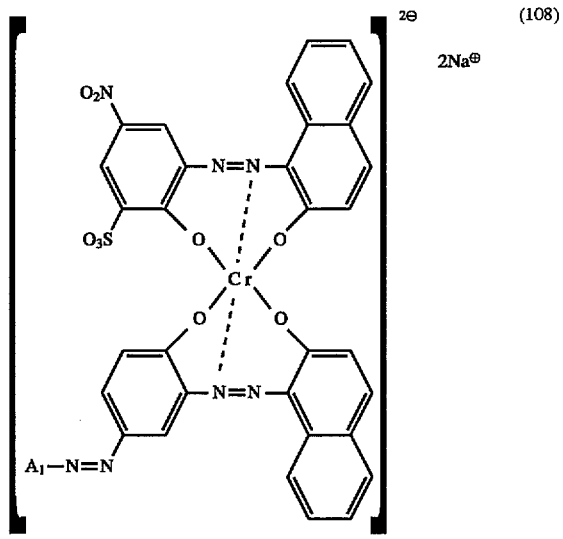

(108)

in which

A₁ is as defined in column 2 in the following Table 2, which dye wool and synthetic polyamide fibre material in black colour shades can be obtained in an analogous manner to the instructions in Preparation Example 1.

TABLE 2

| Ex. | A₁ |
|---|---|
| 17 | 4-methoxy-2-sulfophenyl (H₃CO-, SO₃H) |
| 18 | 4-methoxy-2-sulfophenyl (OCH₃, SO₃H) |
| 19 | 2,4-dimethoxyphenyl (H₃CO-, OCH₃) |
| 20 | 4-methyl-2-(2-hydroxyethoxy)phenyl (OCH₂CH₂OH, H₃C-) |
| 21 | 4-sulfamoylphenyl (H₂NO₂S-) |

TABLE 2-continued

| Ex. | A₁ |
|---|---|
| 22 | 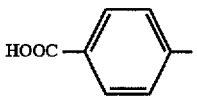 HOOC— |
| 23 | 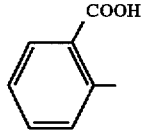 COOH |
| 24 | 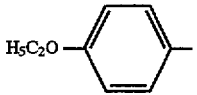 H₅C₂O— |

DYEING EXAMPLE 1

10 parts of polyamide 6,6 fabric are dyed in 200 parts of an aqueous liquor which comprises 1.32% of the 1:2 chromium complex dye according to Example 15, based on the fibre weight, and is brought to pH 6 with acetic acid and sodium acetate. The dyebath is heated to 98° C. in the course of 45 minutes, kept at 96° C. to 98° C. for 60 minutes and then cooled to 70° C. in the course of 15 minutes. The dyed fabric is then removed and rinsed and dried in the customary manner. A fabric dyed in a black colour shade is obtained.

DYEING EXAMPLES 2 to 21

The procedure described in Dyeing Example 1 is repeated, but using the dyes or dye mixtures given in column 2 in the following Table 3 in the amounts stated there instead of 1.32% of the 1:2 chromium complex dye according to Example 15. Polyamide 6,6 fabric which has been dyed in the colour shades stated in column 3 is obtained. The amounts of the dyes stated are based on the fibre weight.

TABLE 3

| Ex. | Dye or dye mixture | Colour shade |
|---|---|---|
| 2 | 1.3% of the 1:2 chromium complex dye according to Example 11 | black |
| 3 | 1.2% of the 1:2 chromium complex dye according to Example 2 | black |
| 4 | Dye mixture of 0.6% of the 1:2 chromium complex dye according to Preparation Example 1 and 0.14% of the symmetric 1:2 cobalt complex dye of the compound of the formula 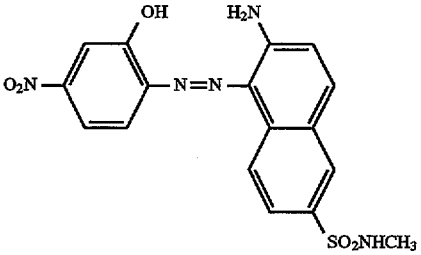 (109). | grey |

TABLE 3-continued

| Ex. | Dye or dye mixture | Colour shade |
|---|---|---|
| 5 | Dye mixture of 0.6% of the 1:2 chromium complex dye according to Example 15 and 0.12% of the symmetric 1:2 cobalt complex dye of the compound of the formula (109). | grey |
| 6 | Dye mixture of 0.5% of the 1:2 chromium complex dye according to Example 2 and 0.12% of the symmetric 1:2 cobalt complex dye of the compound of the formula (109). | grey |
| 7 | Dye mixture of 0.11% of the 1:2 chromium complex dye according to Preparation Example 1 and 0.4% of the symmetric 1:2 cobalt complex dye of the compound of the formula 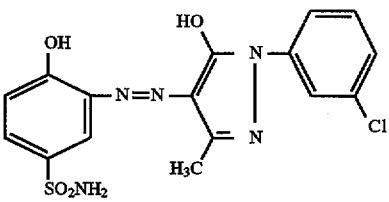 (109). and 0.024% of the symmetric 1:2 cobalt complex dye of the compound of the formula 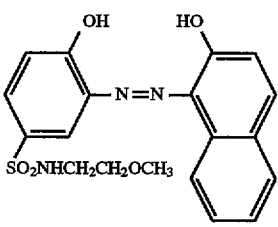 (111). | beige |
| 8 | Dye mixture of 0.11% of the 1:2 chromium complex dye according to Example 15 and 0.4% of the symmetric 1:2 cobalt complex dye of the compound of the formula (110) and 0.024% of the symmetric 1:2 cobalt complex dye of the compound of the formula (111). | beige |
| 9 | Dye mixture of 0.11% of the 1:2 chromium complex dye according to Example 2 and 0.4% of the symmetric 1:2 cobalt complex dye of the compound of the formula (110) and 0.024% of the symmetrical 1:2 cobalt complex dye of the compound of the formula (111). | beige |
| 10 | Dye mixture of 0.31% of the 1:2 chromium complex dye according to Preparation Example 1 and 0.53% of the symmetric 1:2 cobalt complex dye of the compound of the formula (110) and 0.11% of the unsymmetric 1:2 cobalt complex dye of the compounds of the formulae 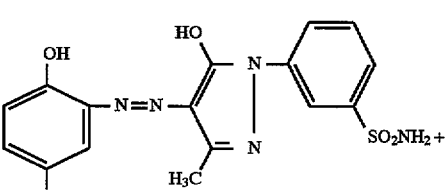 (112) | brown |

TABLE 3-continued

| Ex. | Dye or dye mixture | Colour shade |
|---|---|---|
| | ![structure with OH, HO, N=N, SO2NH2, naphthalene] (113). | |
| 11 | Dye mixture of<br>0.31% of the 1:2 chromium complex dye according to Example 15 and<br>0.53% of the symmetric 1:2 cobalt complex dye of the compound of the formula (110) and<br>0.11% of the unsymmetric 1:2 cobalt complex dye of the compounds of the formulae (112) and (113). | brown |
| 12 | Dye mixture of<br>0.31% of the 1:2 chromium complex dye according to Example 2 and<br>0.53% of the symmetric 1:2 cobalt complex dye of the compound of the formula (110) and<br>0.11% of the unsymmetric 1:2 cobalt complex dye of the compounds of the formulae (112) and (113). | brown |
| 13 | Dye mixture of<br>0.34% of the 1:2 chromium complex dye according to Preparation Example 1 and<br>0.26% of the symmetric 1:2 cobalt complex dye of the compound of the formula (110) and<br>0.065% of the symmetric 1:2 cobalt complex dye of the compound of the formula (111) and<br>0.074% of the symmetric 1:2 cobalt complex dye of the compound of the formula (109). | grey |
| 14 | Dye mixture of<br>0.34% of the 1:2 chromium complex dye according to Example 15 and<br>0.26% of the symmetric 1:2 cobalt complex dye of the compound of the formula (110) and<br>0.065% of the symmetric 1:2 cobalt complex dye of the compound of the formula (111) and<br>0.074% of the symmetric 1:2 cobalt complex dye of the compound of the formula (109). | grey |
| 15 | Dye mixture of<br>0.34% of the 1:2 chromium complex dye according to Example 2 and<br>0.26% of the symmetric 1:2 cobalt complex dye of the compound of the formula (110) and<br>0.065% of the symmetric 1:2 cobalt complex dye of the compound of the formula (111) and<br>0.074% of the symmetric 1:2 cobalt complex dye of the compound of the formula (109). | grey |
| 16 | Dye mixture of<br>0.09% of the 1:2 chromium complex dye according to Preparation Example 1 and<br>0.06% of the symmetric 1:2 cobalt complex dye of the compound of the formula (110) and<br>0.07% of the symmetric 1:2 cobalt complex dye of the compound of the formula (111) and<br>0.28% of the 1:2 cobalt complex dye of the compound of the formula (114). | grey |
| | ![structure with H2NO2S, NH, N=N, HO, SO2NHCH3, phenyl] | |
| 17 | Dye mixture of<br>0.09% of the 1:2 chromium complex dye according to Example 1.5 and<br>0.06% of the symmetric 1:2 cobalt complex dye of the compound of the formula (110) and<br>0.07% of the symmetric 1:2 cobalt complex dye of the compound of the formula (111) and<br>0.28% of the 1:2 cobalt complex dye of the compound of the formula (114). | grey |
| 18 | Dye mixture of<br>0.09% of the 1:2 chromium complex dye according to Example 2 and<br>0.06% of the symmetric 1:2 cobalt complex dye of the compound of the formula (110) and<br>0.07% of the symmetric 1:2 cobalt complex dye of the compound of the formula (111) and<br>0.28% of the 1:2 cobalt complex dye of the compound of the formula (114). | grey |
| 19 | Dye mixture of<br>0.215% of the 1:2 chromium complex dye according to Preparation Example 1 and<br>0.25% of the unsymmetric 1:2 chromium complex dye of the compounds of the formulae<br>![structure OH, HO, HO3S, N=N, naphthalene] (115)<br>+<br>![structure O2N, OH, HN, N=N, O2N, naphthalene, phenyl] (116)<br>and<br>0.035% of the anthraquinone dye of the formula | grey |

TABLE 3-continued

| Ex. | Dye or dye mixture | Colour shade |
|---|---|---|
| | 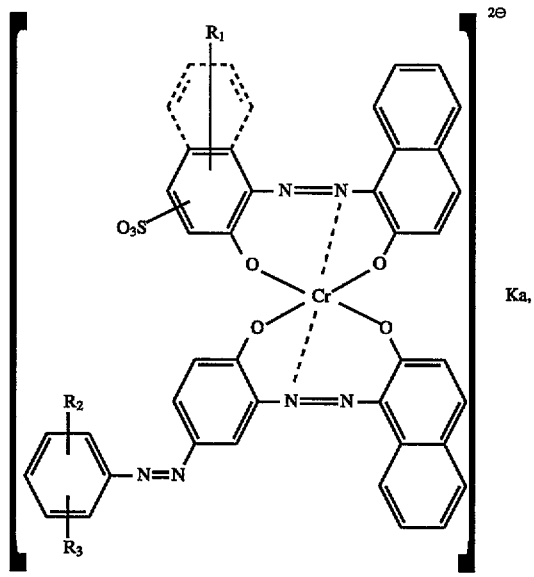 (117). | |
| 20 | Dye mixture of<br>0.215% of the 1:2 chromium complex dye according to Example 15 and<br>0.025% of the unsymmetric 1:2 chromium complex dye of the compounds of the formulae (115) and (116) and<br>0.035% of the anthraquinone dye of the formula (117). | grey |
| 21 | Dye mixture of<br>0.215% of the 1:2 chromium complex dye according to Example 2 and<br>0.25% of the unsymmetric 1:2 chromium complex dye of the compounds of the formulae (115) and (116) and<br>0.035% of the anthraquinone dye of the formula (117). | grey |

What is claimed is:

1. A dye mixture which comprises at least one 1:2 chromium complex dye of the formula (1)

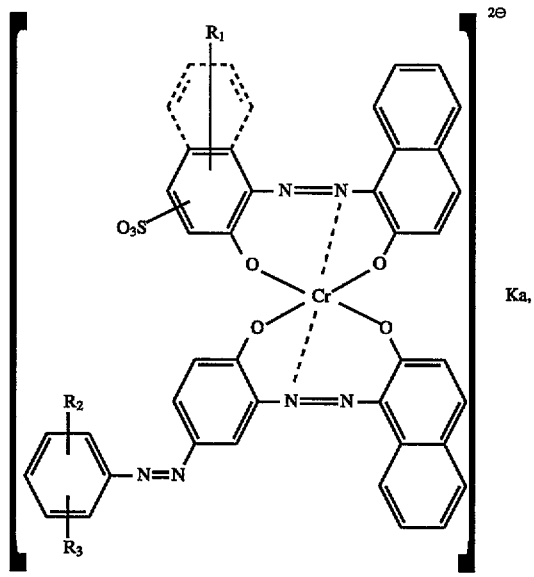

in which $R_1$ is hydrogen or nitro,

Ka is a cation and $R_2$ is hydrogen, $C_1$–$C_4$ alkyl or $C_1$–$C_4$alkoxy.

$R_3$ is $C_2$–$C_4$hydroxyalkoxy or a $C_1$–$C_4$alkoxy radical bonded in the 4-position, together with at least one 1:2 chromium or 1:2 cobalt complex dye of two identical or two different azo compounds from the group consisting of compounds of the formulae (2), (3) and (4)

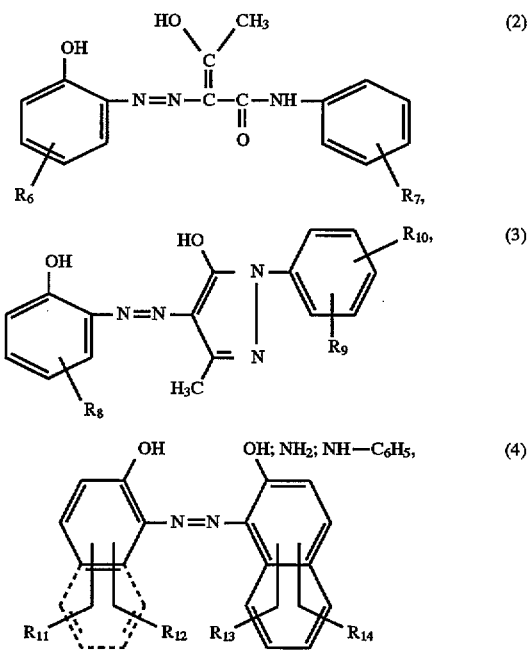

in which $R_6$, $R_7$, $R_8$, $R_9$, $R_{10}$, $R_{11}$, $R_{12}$, $R_{13}$ and $R_{14}$ independently of one another are hydrogen, $C_1$–$C_4$alkyl, $C_1$–$C_4$alkoxy, $C_2$–$C_4$alkanoylamino, halogen, sulfo, hydroxyl, nitro or sulfamoyl, or N—$C_1$–$C_4$alkylsulfamoyl which is unsubstituted or further substituted in the alkyl part by hydroxyl or $C_1$–$C_4$alkoxy, or together with at least one 1:2 cobalt complex dye of the formazan compound of the formula (5)

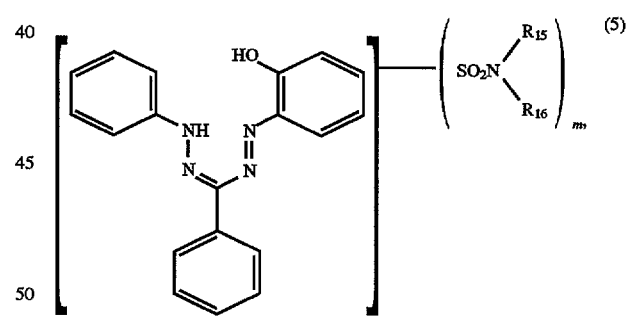

in which $R_{15}$ and $R_{16}$ independently of one another are hydrogen or $C_1$–$C_4$alkyl which is unsubstituted or substituted by hydroxyl or $C_1$–$C_4$alkoxy, m is the number 1,2 or 3 and the phenyl radicals of the compound of the formula (5) contain no further substituents or are further substituted by $C_1$–$C_4$alkyl, $C_1$–$C_4$alkoxy, $C_2$–$C_4$alkanoylamino, $C_1$–$C_4$alkylsulfonyl, $C_1$–$C_4$hydroxyalkylsulfonyl, halogen, sulfo, hydroxyl, carboxyl or nitro, or together with at least one anthraquinone dye of the formula (6)

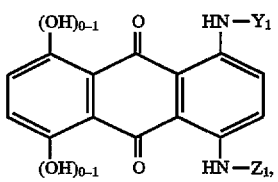

in which

Y₁ is $C_1$–$C_4$alkyl; phenyl which is unsubstituted or substituted by $C_1$–$C_4$alkyl, $C_1$–$C_4$alkoxy, halogen or sulfo; phenyl-$C_1$–$C_8$alkyl, in which the phenyl radical contains no further substituents or is substituted by $C_1$–$C_4$alkyl, $C_1$–$C_4$alkoxy, halogen, sulfo, benzoylaminomethyl, chloroacetyl aminomethyl or acryloylaminomethyl; cyclohexyl which is unsubstituted or substituted by $C_1$–$C_4$alkyl or sulfobenzyl; or 1,2,3,4-tetrahydronaphthyl which is substituted by sulfo, and Z₁ is defined as above for Y₁, or is a radical of the formula

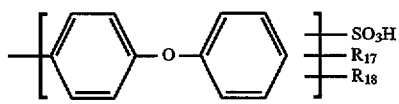

in which $R_{17}$ is hydrogen, $C_1$–$C_4$alkyl, $C_1$–$C_4$alkoxy or halogen and $R_{18}$ is chloroacetylaminomethyl or acryloylaminomethyl.

2. A dye mixture according to claim 1, which comprises, as the 1:2 chromium complex dye of the formula (1), a dye of the formula

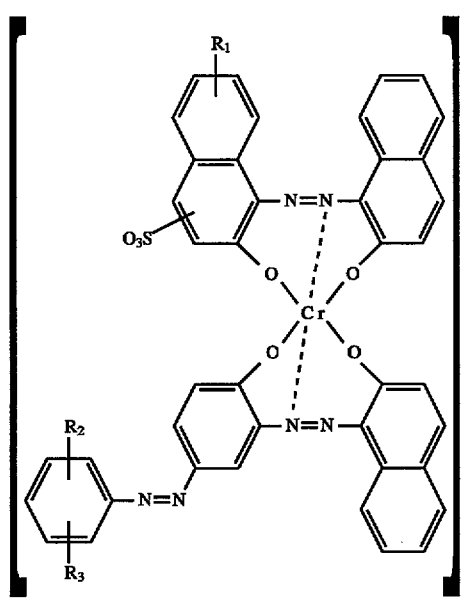

in which $R_1$, $R_2$, $R_3$ and Ka are as defined in claim 1.

3. A dye mixture according to claim 1 in which $R_2$ is hydrogen.

4. A dye mixture according ot claim 1 in which $R_1$ is hydrogen.

5. A dye mixture according to claim 1, which comprises, as the 1:2 chromium complex dye of the formula (1), a dye of the formula

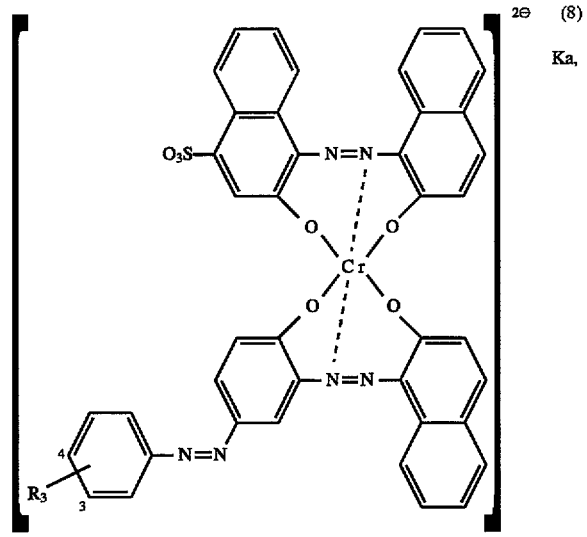

in which $R_3$ is a $C_1$–$C_4$alkoxy radical bonded in the designated 4-position and Ka is a cation.

6. A dye mixture according to claim 1, in which

Ka is an alkali metal, alkaline earth metal, ammonium, alkanolammonium or alkylammonium cation.

7. A dye mixture according to claim 1, which comprises at least one 1:2 chromium or 1:2 cobalt complex dye of two identical or two different azo compounds from the group consisting of compounds of the formulae (2), (3) and (4).

8. A process for dyeing or printing leather or fibre material containing hydroxyl groups or containing nitrogen, with a dye mixture, which comprises contacting the material with a dye mixture according to claim 1.

9. A process according to claim 8, wherein a naturally occurring or synthetic polyamide fibre material is dyed or printed.

* * * * *